United States Patent
Hung

(10) Patent No.: US 11,637,708 B2
(45) Date of Patent: Apr. 25, 2023

(54) METHOD FOR CREATING A HIERARCHICAL THRESHOLD SIGNATURE DIGITAL ASSET WALLET

(71) Applicant: Chiu Hung Hung, Hong Kong (HK)

(72) Inventor: Chiu Hung Hung, Hong Kong (HK)

(*) Notice: Subject to any disclaimer, the term of this patent is extended or adjusted under 35 U.S.C. 154(b) by 50 days.

(21) Appl. No.: 17/320,220

(22) Filed: May 14, 2021

(65) Prior Publication Data

US 2021/0359863 A1 Nov. 18, 2021

Related U.S. Application Data

(60) Provisional application No. 63/025,147, filed on May 14, 2020.

(51) Int. Cl.
*H04L 9/00* (2022.01)
*H04L 9/08* (2006.01)
*H04L 9/32* (2006.01)

(52) U.S. Cl.
CPC ............ *H04L 9/3247* (2013.01); *H04L 9/007* (2013.01); *H04L 9/008* (2013.01); *H04L 9/085* (2013.01); *H04L 9/0825* (2013.01); *H04L 9/0861* (2013.01); *H04L 2209/56* (2013.01)

(58) Field of Classification Search
CPC ....... H04L 9/3247; H04L 9/007; H04L 9/008; H04L 9/0825; H04L 9/085; H04L 9/0861; H04L 2209/56
See application file for complete search history.

(56) References Cited

U.S. PATENT DOCUMENTS

| | | | | |
|---|---|---|---|---|
| 2015/0074401 | A1* | 3/2015 | D'Souza | H04L 9/0825 713/168 |
| 2019/0354969 | A1* | 11/2019 | Spector | G06Q 20/10 |
| 2019/0370792 | A1* | 12/2019 | Lam | G06Q 20/223 |
| 2020/0044863 | A1* | 2/2020 | Yadlin | G06F 21/44 |
| 2020/0126075 | A1* | 4/2020 | Fisch | G06F 21/6245 |
| 2020/0213099 | A1* | 7/2020 | Wright | H04L 9/3255 |
| 2020/0334674 | A1* | 10/2020 | Youngblood | H04L 9/50 |
| 2021/0067345 | A1* | 3/2021 | Shamai | H04L 9/14 |
| 2021/0119785 | A1* | 4/2021 | Ben-Reuven | H04L 63/126 |

FOREIGN PATENT DOCUMENTS

| WO | WO-2019159172 A1 * | 8/2019 | ............ G06F 21/57 |
|---|---|---|---|
| WO | WO-2021073953 A1 * | 4/2021 | ......... G06Q 20/3674 |

OTHER PUBLICATIONS

Combined Search and Examination Report of British Patent Application No. 2106835.8 dated Nov. 15, 2021.
(Continued)

*Primary Examiner* — Darshan I Dhruv

(57) ABSTRACT

A method for creating a hierarchical threshold signature digital asset wallet using a hierarchical distributed key generator (DKG) and a signature protocol includes steps of generating a public key by users and the digital asset wallet service platform, securing and controlling a portion of shares, sending a transaction signing request, validating the transaction signing request, creating a signature of the signed transaction, and uploading the signed transaction to the corresponding digital asset blockchain network and monitoring the execution of the signed transaction.

9 Claims, 5 Drawing Sheets

(56) References Cited

OTHER PUBLICATIONS

Nasrollah Pakniat et al. Distributed Key Generation Protocol with Hierarchical Threshold Access Structure, IET Information Security, 2015, pp. 248-255, vol. 9, Iss. 4.
Chihyun Chuang, A Hierarchical Threshold Signature, Nov. 5, 2019.
Tamir Tassa, Hierarchical Threshold Secret Sharing, Journal of Cryptography, Feb. 7, 2007, pp. 237-264, vol. 20.

* cited by examiner

METHOD FOR CREATING A HIERARCHICAL THRESHOLD SIGNATURE DIGITAL ASSET WALLET

CROSS-REFERENCE TO RELATED APPLICATIONS

This application claims the benefit of U.S. provisional application No. U.S. 63/025,147 titled "Hierarchical Threshold Signature Scheme and Digital Asset Wallet Application" filed by the applicant on 14 May 2020. which is incorporated herein by reference in its entirety.

FIELD OF THE INVENTION

Embodiments of the present disclosure relate to the field of secure communications and more particularly to a hierarchical threshold signature scheme and digital asset wallet application.

BACKGROUND OF THE INVENTION

Public key cryptography technology is a kind of technology that the information such as the file that sends to designated recipients, messages are encrypted for extensive use. Adopt the system of this cryptographic technique to generate PKI and the private key that is associated on a pair of mathematics for each user, PKI publishes by certain mode, makes any sender all can obtain recipient's PKI, and private key is preserved by the recipient is secret.

During common key cryptosystem is used, an important demand for security is exactly that the PKI of guaranteeing to use belongs to designated recipient definitely, namely needs a kind of security mechanism that user ID (ID) and its PKI are bound together.

In the conventional public-key cryptographic system, for example adopt the system of RSA, DSA, ECC scheduling algorithm, it doesn't matter for the generation of PKI and user's sign, need to provide certificate by Third Party Authentication center CA (Certificate Authority), namely user's PKI and sign are signed, to both bind, this system centered by CA based on the conventional public-key cryptographic system is called public-key infrastructure, i.e. PKI (Public Key Infrastructure). By means of PKI, a lot of applications on the Internet are achieved, such as ecommerce, e-bank etc.

Nowadays, blockchain uses public key cryptography (PKI) gives organization complete and permanent control over a blockchain address and all the digital assets associated with it. Safeguarding and managing the private keys organizations use to sign and register a blockchain transaction has become the most critical digital asset management.

More than four billion dollar worth of digital assets had been compromised or stolen by hackers in 2019 alone. For mass adoption of blockchain to occur, the private key weakness must be addressed.

Methods were proposed to eliminate the single point of failure of private keys with threshold distributed key generation and signature protocols that enables transactions to be signed securely in a distributed way. But in most of the proposed methods, all the participants who are involved in the signing process are assumed to be of the same authority which does not meet the expectation of modern organization structures where multiple levels of authority are a must for organization to adopt and take full advantage of that blockchain offer.

Thus, the present disclosure is aimed to provide a method for creating a digital asset wallet with a hierarchical access structure using a distributed key generator (DKG) and a signature protocol that overcomes the above-discussed drawbacks.

SUMMARY OF THE INVENTION

Embodiments of the present disclosure relates to a method for creating a hierarchical threshold signature digital asset wallet using a hierarchical distributed key generator (DKG) and a signature protocol. The method includes steps of generating a public key (secret key) by users and the digital asset wallet service platform using a hierarchical threshold key generation protocol, securing and controlling a portion of shares by the user and the digital asset wallet service platform in one or more of m disjoint subsets for generating of a signature of a signed transaction, sending a transaction signing request through a wallet service API on the user device to the digital asset wallet service platform by the user for transferring digital assets outside of the hierarchical threshold signature digital asset wallet, validating the transaction signing request based on a predefined access policy, facilitating the user device and the digital asset wallet service platform on a successful validation to jointly run the hierarchical threshold signature protocol to create a signature of the signed transaction, sending the signature of the signed transaction to a corresponding digital asset blockchain network and uploading the signed transaction to the corresponding digital asset blockchain network and monitoring the execution of the signed transaction.

In particular, only authorized subsets of users fulfilling the hierarchical threshold distributed key generator (DKG) are allowed to sign digital asset transactions.

In accordance with an embodiment of the present disclosure, the hierarchical threshold key generation protocol is configured to provide a signing power to a n multiple shares and the set of n multiple shares is partitioned into m disjoint subsets of shares. Particularly, the users in the same subset have equal authority level and the users from different subset have predefined differences in this regard.

In the hierarchical threshold access structure, the authorized subsets are defined by an increasing sequence of threshold parameters $t_0 < t_1 < \ldots < t_m$.

In accordance with an embodiment of the present disclosure, the hierarchical threshold signature protocol enables authorized users of a subset to sign digital asset transactions after satisfying threshold requirements. For example, the group of senders represented by a subset A of authorized shares can generate a valid signature if all of the threshold requirements is satisfied:

$$|A \cap (U_{j=0}^{i} U_i)| \geq t_i \text{ for } i=0, \ldots, m$$

In accordance with an embodiment of the present disclosure, the method allows a plurality of users to jointly generate the public key (secret key) using the threshold distributed key generation protocol. The method comprising steps of broadcasting the public key for a homomorphic encryption by the user, constructing a two random polynomial values, computing the shares corresponding to each of the user and sending the shares through a secure channel, checking the shares for consistency, adding a received private shares by each user, broadcasting a broadcast value for added private shares, checking and verifying the broadcast value, associating a RSA modulus with public key and setting the public key. In particular, each user proves in a Zero-knowledge that the user knows the value of added shares using a Schonorr's protocol and RSA modulus using a proof of knowledge of integer factorization.

In accordance with an embodiment of the present disclosure, the method of generating and verifying a digital signature of a message between a plurality of senders and a recipient, comprising steps of creating one or more hierarchical threshold wallet jointly by a plurality of users, distributing a threshold share (threshold keys) to the users within the hierarchical threshold access structure, validating correctness of all secret shares or keys, generating digital signature of message jointly by the participating users with authorized secret shares, calculating Birkhoff interpolation coefficients $\lambda_{i,S}$ for each user in the authorized subset A such that the user may locally map its own local share $x_i$ into (t,t) share of signing secrets, providing a broadcasting channel for public message exchange and providing a secure channel for each participant for secret message exchange.

Another embodiment of the present disclosure relates to a computer implemented environment for creating a hierarchical threshold signature digital asset wallet using a distributed key generator (DKG) and a signature data protocol. In particular, the computer implemented environment includes a digital asset wallet service platform to allow a user to create at least one hierarchical threshold signature digital asset wallet, a user device for creating and installing hierarchical threshold signature digital asset wallet, a communication network to allow communication between the user device, the digital asset wallet service platform and a blockchain network 108 and the blockchain network to communicate with the user and the digital asset wallet service platform to send, receive and verify a digital asset transaction.

In accordance with an embodiment of the present disclosure, the blockchain network is a corresponding digital asset blockchain network.

Particularly, the user device is configured to jointly run, send and receive the distributed key generator and a signature data to and from the digital asset wallet service platform.

In accordance with an embodiment of the present disclosure, the digital asset wallet service platform further includes an account management module, a key generation module, a policy enforcement module, a transaction signature generation module, a blockchain service module and a wallet service application programming interfaces (API) integrated therein.

In accordance with an embodiment of the present disclosure, the account management module is configured to register and identify a user based on a user information in a database and a plurality of security features.

In accordance with an embodiment of the present disclosure, the key generation module is configured to create at least one hierarchical threshold signature digital asset wallet.

In accordance with an embodiment of the present disclosure, the policy enforcement module is configured to check the transaction signing request by determining whether the transaction signing request adheres to the predefined access policy.

In accordance with an embodiment of the present disclosure, the transaction signature generation module is configured to generate a signature for the corresponding digital asset transaction using a hierarchical threshold signature protocol and sign the transaction. In particular, the signature is only created on successful validation of the traction request.

In accordance with an embodiment of the present disclosure, the blockchain service module is configured to upload the signed transaction to the corresponding blockchain and monitors the execution of the signed transaction.

It is to be understood that both the foregoing general description and the following detailed description of the present disclosure are exemplary and explanatory and are intended to provide further explanation of the invention as claimed.

BRIEF DESCRIPTION OF THE DRAWINGS

So that the manner in which the above-recited features of the present disclosure is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

ELEMENT LIST

Computer Implemented Environment 100
Digital Asset Wallet Service Platform 101
User Device 102
Mobile App 103
Browser 104
Desktop Application 105
Browser Application 106
Communication Network 107
Blockchain Network 108
Wallet Service Application Programming Interfaces (API) 201
Account Management Module 202
Key Generation Module 203
Policy Enforcement Module
Transaction Signature Generation Module 205
Blockchain Service Module 206

DETAILED DESCRIPTION

The present disclosure relates to a method for creating a digital asset wallet with a hierarchical access structure using a distributed key generator (DKG) and a signature protocol.

The principles of the present disclosure and their advantages are best understood by referring to FIG. 1 to FIG. 5. In the following detailed description of illustrative or exemplary embodiments of the disclosure, specific embodiments in which the disclosure may be practiced are described in sufficient detail to enable those skilled in the art to practice the disclosed embodiments.

The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Figure 1:
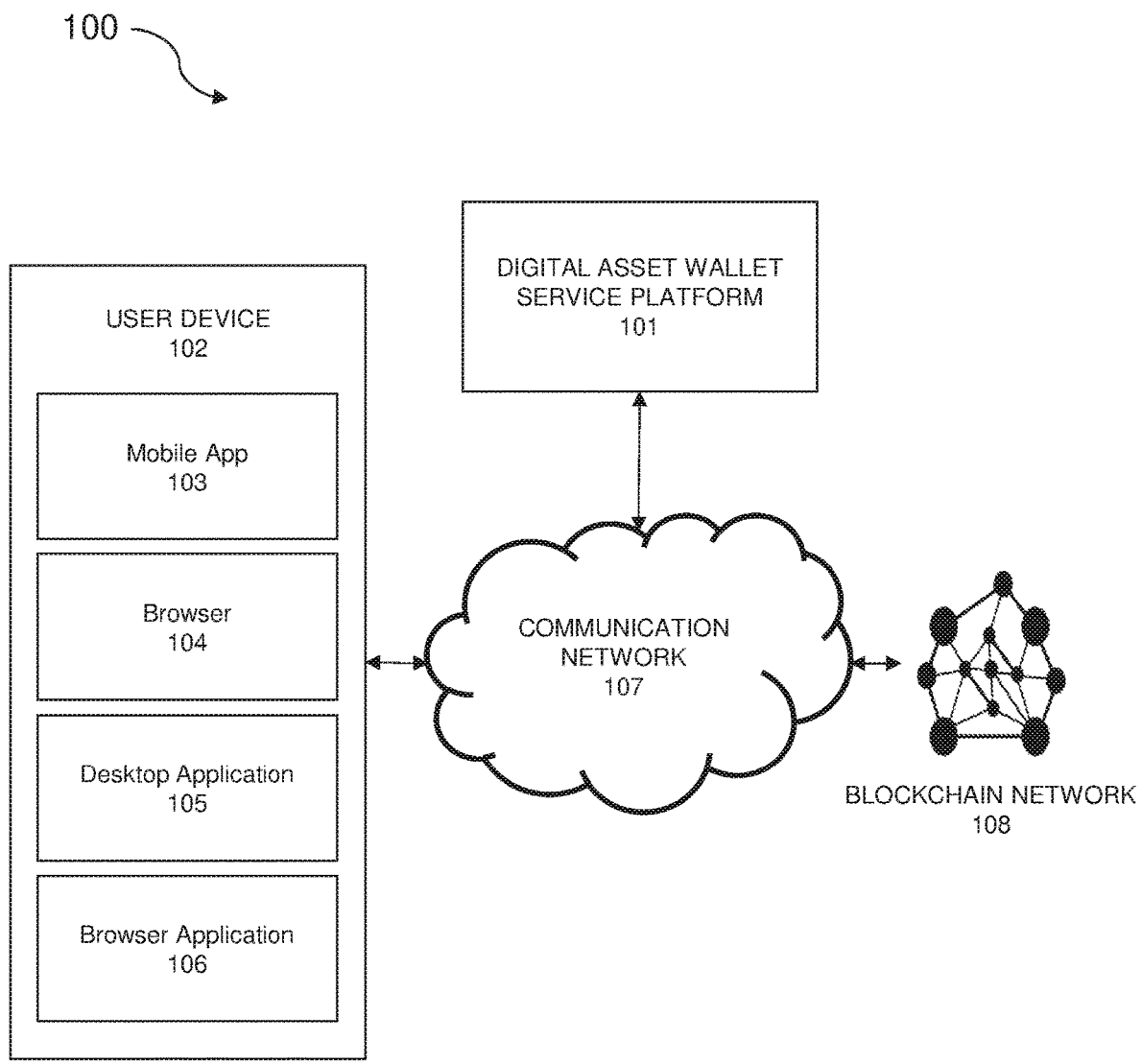
FIG. 1 is a block diagram illustrating a system in computer implemented environment within which various aspects of the present disclosure can be implemented, in accordance with one or more embodiments of the present disclosure.

FIG. 1 is a block diagram illustrating a system in computing environment 100 within which various aspects of the present disclosure can be implemented, in accordance with one or more embodiments of the present disclosure. The computing environment 100 is only one example of a suitable computing environment and is not intended to suggest any limitation as to the scope of user or functionality. Neither should the computing environment 100 be interpreted as having any dependency or requirement relating to any one or combination of components illustrated in the exemplary operating environment.

The system is configured to sign digital transactions by creating a hierarchical threshold signature digital asset wallet using a distributed key generator (DKG) and a signature data protocol. Particularly, the system includes user device 102 and digital asset wallet service platform 101, communication network 107 and blockchain networks 108 for digital assets.

The digital asset wallet service platform 101 to allow a user to create a digital asset wallet with the hierarchical access structure.

In accordance with an embodiment of the present disclosure, digital asset wallet service platform 101 is an enterprise digital asset wallet service platform allowing enterprise users to create a hierarchical threshold signature digital asset wallet.

For example, in enterprise management there are 10 managers divided into 3 different levels of authority. Among them, 3 managers are in the highest level, 3 managers in the second level and 4 managers in the last level. An ordinary threshold signature scheme that gives all managers the same authority in signing transactions or documents of the enterprise. However, with hierarchical access structure valid signatures are generated with the condition that if at least 2 managers from the first level, at least 4 managers from either the first level or the second one and at least 7 managers from all the enterprise's managers have cooperated jointly in generating the signature.

Particularly, user device 102 allows the user to create the hierarchical threshold signature digital asset wallet and install therein on the user device 102. Moreover, the user device 102 operates as a service client to jointly run, send and receive hierarchical distributed key generation and signature data to and from the digital asset wallet service platform 101. The client application may be implemented in different computer languages, executables or channels which may include mobile app 103, web applications using internet browsers 104, native computer applications 105 or browser extensions 106.

The communication network 107 to allow communication between the user device 102, the digital asset wallet service platform 101 and a blockchain network 108.

In particular, the blockchain network 108 is a corresponding digital asset blockchain network. And, the blockchain network 108 subsequently sends, receives and verifies digital asset transactions by communicating with the user on the user device 102 and the digital asset wallet service platform 101.

Figure 2:
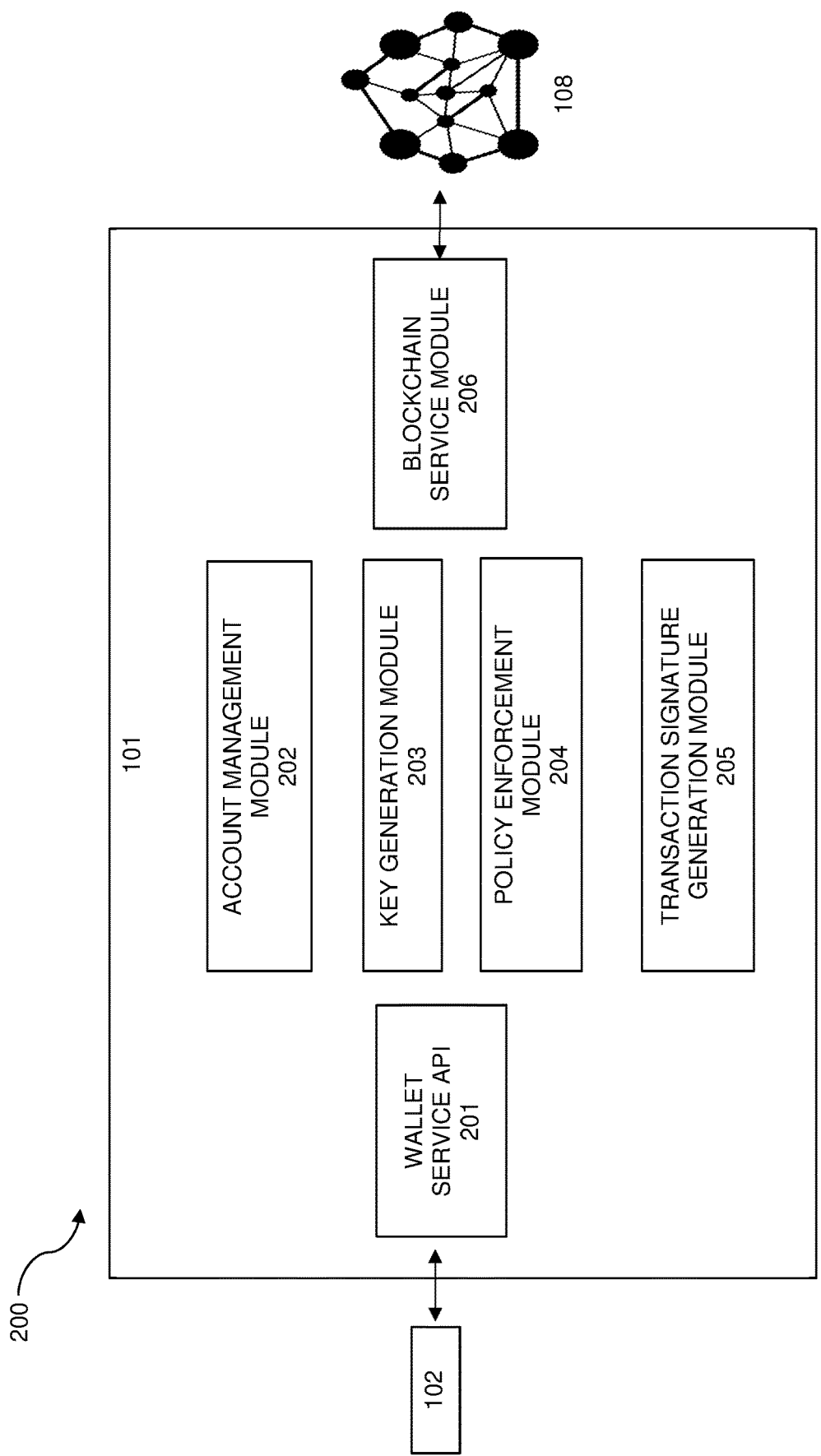
FIG. 2 is a block diagram illustrating an exemplary component architecture for the digital asset wallet service platform in accordance with an embodiment of the present disclosure.

FIG. 2. is a block diagram illustrating an exemplary component architecture 200 of the digital asset wallet service platform in accordance with one or more embodiments of the present disclosure. In particular, the digital asset wallet service platform 101 includes an account management module 202, a key generation module 203, a policy enforcement module 204, a transaction signature generation module 205, a blockchain service module 206 and a wallet service application programming interface (API) 201.

In accordance with an embodiment of the present disclosure, the wallet service API provides 201 is a set application programming interfaces for the client applications which may include mobile application 103, web applications using internet browsers 104, native computer applications 105 or browser extensions 106 to interact with different modules in the digital asset wallet service platform 101.

In accordance with an embodiment of the present disclosure, the account management module 202 is configured to utilize user registration information stored in a database and one or more system generated security factors to register a user for creating a new digital wallet. Moreover, the account management module 202 may automatically penalize users or user device 102 or any computing devices attempting to defraud the digital asset wallet service platform 101.

In an exemplary example, the application interface key pairs may determine whether the user is a legitimate user.

In accordance with an embodiment of the present disclosure, the key generation module 203 is configured to facilitate a hierarchical threshold signature digital asset wallet when a new wallet is created by the user. In particular, the hierarchical threshold signature digital asset wallet is created using a hierarchical threshold key generation protocol. The hierarchical threshold key generation protocol 400 distributes signing power to n multiple shares such that the set of shares is partitioned into m disjoint subsets of shares $\{U_1, U_2, \ldots, U_m\}$. Moreover, all the shares in the same subset are considered equal in terms of their authority level and the shares from different subsets have predefined differences. Further, in this hierarchical threshold access structure, the authorized subsets are defined by a strictly increasing sequence of threshold parameters $t_0 < t_1 < \ldots < t_m$.

In accordance with an embodiment of the present disclosure, the policy enforcement module 204 is configured to validate a transaction signing request by determining whether the transaction signing request adheres to the predefined access policy. In particular, the policy may include checks pertaining to but not limited to, a transaction value, a destination, a transaction time etc. to determine the transaction's legitimacy.

In accordance with an embodiment of the present disclosure, transaction signature generation module 205 facilitates generation of a hierarchical digital transaction signature utilizing the hierarchical threshold signature protocol 500 to generate signature for the corresponding digital asset transaction. In particular, the transaction signature generation module 205 generates the transaction signature when the policy enforcement module 204 is convinced of the transaction's legitimacy.

For example, A is a subset of authorized users can sign the transaction only when all of the threshold requirements are satisfied:

$$|A \cap (U_{j=0}^i U_j)| \geq t_i \text{ for } i=0, \ldots, m.$$

In particular, when a transaction signing request is made, the requesting user or user device will be authenticated by the account management module 202 and the signing request is validated by a policy enforcement module 204 to ensure that the request adheres to the predefined policy.

In accordance with an embodiment of the present disclosure, the blockchain service module 206 uploads the signed transaction to the corresponding blockchain and monitors its execution on successful signing of the transaction.

Figure 3:
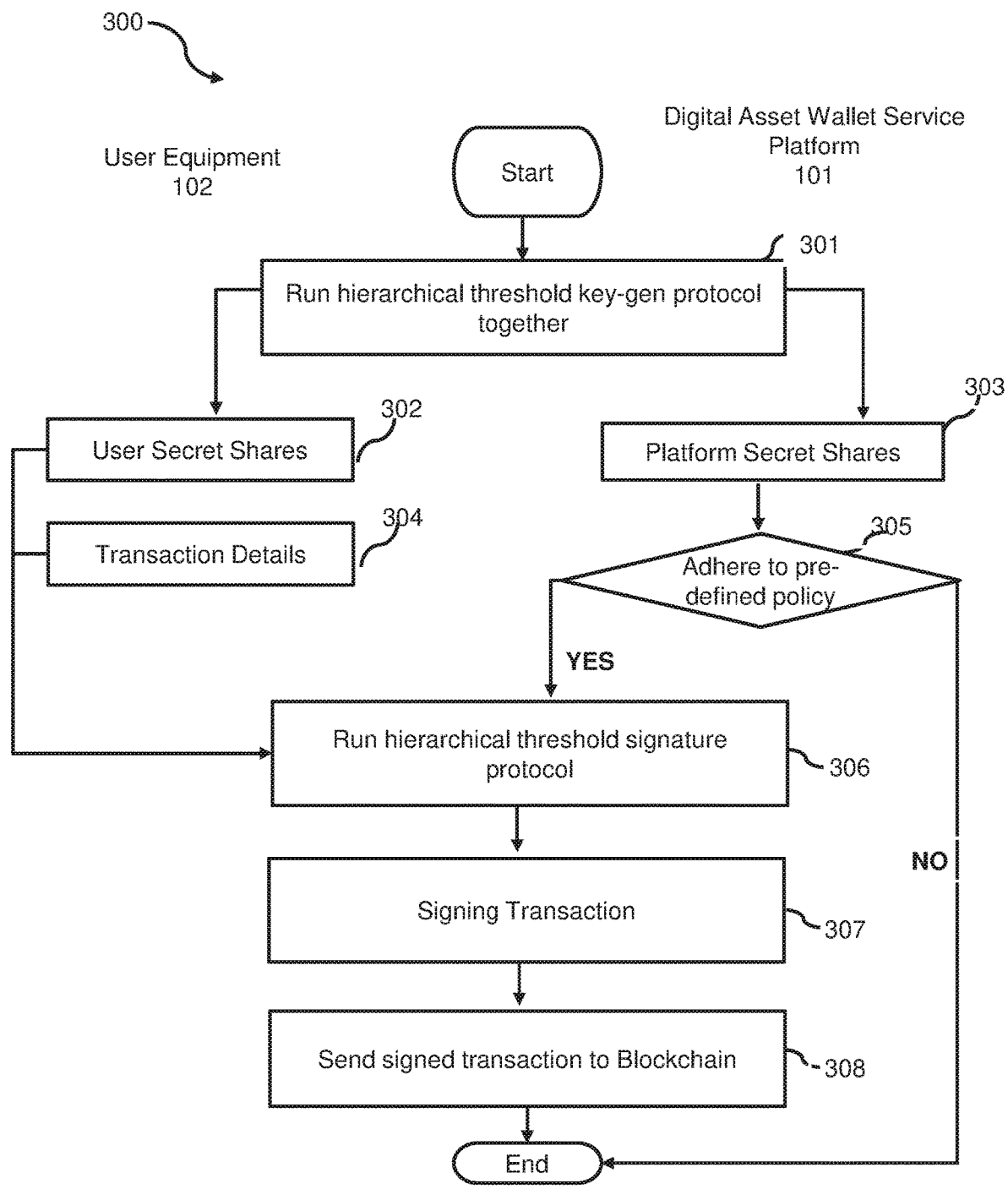
FIG. 3. is a flow diagram illustrating a method for signing a digital asset transaction in a hierarchical threshold signature digital asset wallet using a hierarchical distributed key generator (DKG) and a signature protocol in accordance with an embodiment of the present disclosure.

FIG. 3. is a flow diagram illustrating a computer implemented method for signing a digital asset transaction in a hierarchical threshold signature digital asset wallet using a hierarchical distributed key generator (DKG) and a signature protocol. In particular, the signature protocol allows authorized subset of users fulfilling the distributed key generator (DKG) hierarchical access structure to sign digital asset transactions.

The method 300 starts at step 301 and proceeds to step 302. At step 301 the users using the user device 102 and the digital asset wallet service platform 101 run the hierarchical threshold key generation protocol 400 to generate a public key (secret key). In particular, the hierarchical threshold key generation protocol 400 is configured to provide a signing power to a n multiple shares and the set of n multiple shares is partitioned into m disjoint subsets of shares (U1, U2, . . . , Um). And, all the shares in the same subset are considered equal in terms of their authority level, the ones from different subsets have predefined differences. Moreover, the authorized subset of is defined by an increasing sequence of threshold parameters $t_0 < t_1 < \ldots < t_m$. Furthermore, the user (U={P1, P2, . . . , Pn}) in the same subset has an equal authority level.

At step 302, the user secures and controls a portion of the shares (user secure shares) in one or more of m disjoint subsets such that a signature of a signed transaction is generated using at least one of the user secure shares.

Step 302 proceeds to 303. At step 303, the digital asset wallet service platform 101 secures and controls a portion of the shares (platform secure shares) in one or more of m disjoint subsets such that the signature of a signed transaction is generated using at least one of the platform secure shares.

Step 303 proceeds to 304. At step 304, the user sends a transaction signing request through a wallet service API 201 to the digital asset wallet service platform 101 for transferring digital assets outside of the hierarchical threshold signature digital asset wallet.

Step 304 proceeds to 305. At step 305, the policy enforcement module 204 of the digital asset wallet service platform 101 validates the transaction signing request by determining whether the transaction signing request adheres to a predefined access policy.

In one embodiment of the present disclosure, when the determination is "NO" and the validation of the transaction signing request is unsuccessful then the method 300 ends.

In another embodiment of the present disclosure, when the determination is "YES" and the validation of the transaction signing request is successful then the method 300 proceeds to step 306.

At step 306, the transaction signature generation module 205 facilitates the user device 102 and the digital asset wallet service platform 101 to jointly run the hierarchical threshold signature protocol 500 to create a signature of the signed transaction.

Step 306 proceeds to step 307. At step 307, the hierarchical threshold signature protocol 500 creates a signature of the signed transaction.

Step 307 proceeds to step 308. At step 308, the signature of the signed transaction is sent to a corresponding digital asset blockchain network. In particular, the blockchain service module 206 uploads the signed transaction to the corresponding digital asset blockchain network and monitors the execution of the signed transaction.

Figure 4:
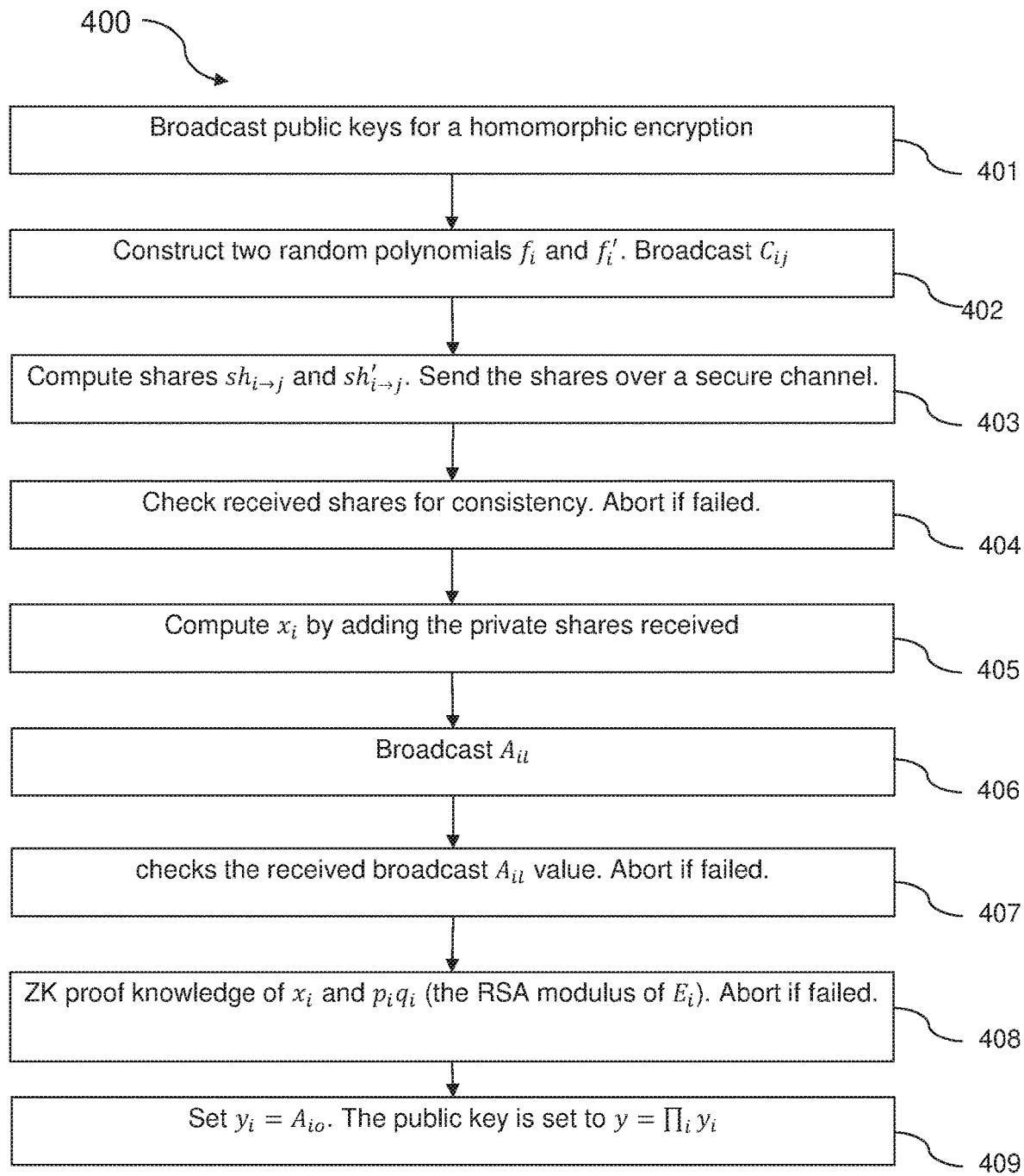
FIG. 4. is a flow diagram illustrating a method allowing multiple users to jointly generate the public key (the secret key) using the hierarchical threshold key generation protocol in accordance with an embodiment of the present disclosure.

FIG. 4. is a flow diagram illustrating a method to allow multiple users to jointly generate the public key (and/or the secret key) using the hierarchical threshold key generation protocol 400 in accordance with an embodiment of the present disclosure. The method starts at step 401 and proceeds to step 402.

At step 401, each user ($P_i \in U$) broadcasts the public key ($E_i$) for a homomorphic encryption (Paillier's cryptosystem).

At step 402, each user ($P_i \in U$) selects random values $\{a_{ij}\}_{j=0}^{t-1}$ and $\{b_{ij}\}_{j=0}^{t-1}$ and constructs polynomials f_i and f_i'; wherein $$f_i(x) = a_0 + a_{i1}x + \ldots + a_{i(t-1)}x^{t-1} \pmod{q}$$

$$f_i'(x) = b_0 + b_{i1}x + \ldots + b_{i(t-1)}x^{t-1} \pmod{q}.$$

Also, each user ($P_i \in U$) broadcasts (C_ij), and $$\{C_{ij} = g^{a_{ij}} h^{b_{ij}} \pmod{p}\}_{j=0}^{t-1}.$$

At step 403, the shares ($sh_{i \to j}$ and $sh'_{i \to j}$) are computed corresponding to each user ($P_i \in U$) and the shares ($sh_{i \to j}$ and $sh'_{i \to j}$) are sent through a secure channel, and wherein:

$$(sh_{i \to j} = f_i^{(\tau_{k-1})}(j) sh'_{i \to j} = f_i'^{(\tau_{k-1})}(j),)$$

and k is such that $P_j \in U_k$

At step 404, each user $P_j \in U$ check the shares ($sh_{i \to j}$ and $sh'_{i \to j}$) for consistency by verifying for i=1, . . . , n (i≠j), such that $$g^{sh_{i \to j}} h^{sh'_{i \to j}} = \prod_{l=0}^{t-1} C_{il}^{g_l^{(\tau_{k-1})}(j)} \pmod{p}$$

where k is such that $P_j \in U_k$ and $g_l^{(\tau_{k-1})}$ is the value of $(t_{k-1})$-th derivative of $g_l(x) = x^l$ at the point x=j.

If the check fails at step 404, then the user ($P_i \in U$) aborts the protocol.

At step 405, each user ($P_i \in U$) computes ($x_i$) is computed by adding a received private share and;

$$x_i = \sum_j sh_{j \to i}$$

At step 406, each user ($P_i \in U$) broadcasts a broadcast value ($A_{il}$) for added private shares; and $$\{A_{il} = g^{a_{il}} \pmod{p}\}_{j=0}^{t-1}$$

At step 407, each user ($P_i \in U$) checks the broadcast value by verifying $$g^{sh_{i \to j}} = \prod_{l=0}^{t-1} A_{il}^{g_l^{(t_k-1)}(j)} \pmod{p}$$

where k is such that $P_j \in U_k$ and $g_l^{(t_k-1)}$ is the value of $(t_{k-1})$-th derivative of $g_l(x) = x^l$ at the point $x=j$.

If the check fails at step 407, then the user ($P_i \in U$) aborts the protocol.

At step 408, associating RSA modulus ($N_i = p_i q_i$) with public key ($E_i$). And each user ($P_i \in U$) proves in a Zero-knowledge that the user knows $x_i$ using a Schonorr's protocol and $p_i, q_i$ using a proof of knowledge of integer factorization.

At step 409, each user set $y_i = A_{io} = g^{a_{io}} \pmod{p}$

And, the public key is set to y, and $$y = \prod_i y_i$$

Figure 5:
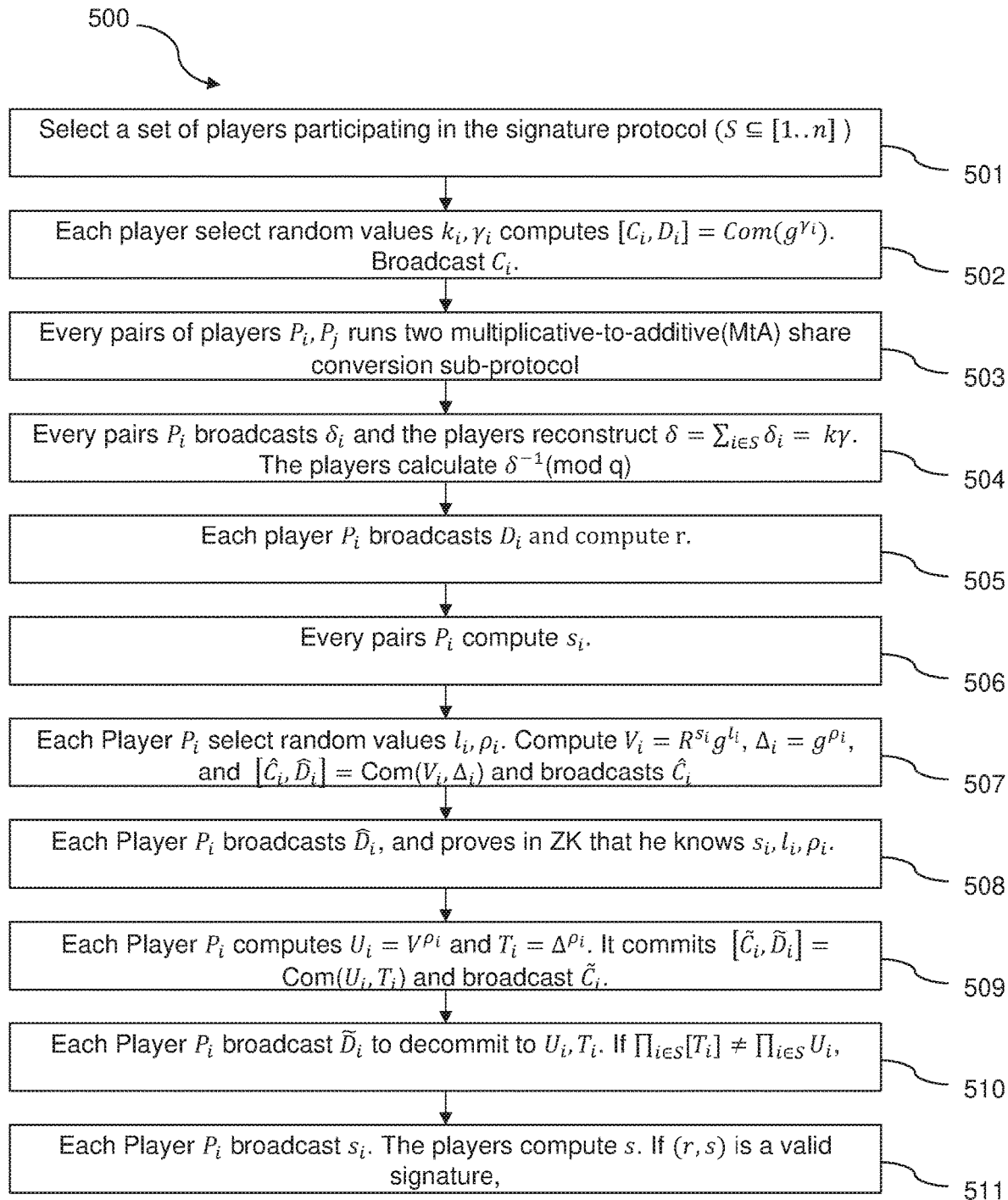
FIG. 5. is a flow diagram illustrating a method allowing authorized subsets of users to create a joint threshold digital signature using the signature protocol in accordance with an embodiment of the present disclosure.

FIG. 5. is a flow diagram illustrating a method allowing authorized subsets of users to create a joint threshold digital signature using the signature protocol in accordance with an embodiment of the present disclosure. In particular, the users fulfilling the hierarchical distributed key generator (DKG) can only create the joint signature.

The method starts at step 501 and proceeds to step 502. At step 501, a user selects a set of users $S \subseteq [1 \ldots n]$ to participate in the signature protocol. Assuming, $|S|=t$ and $P_i \in S$ such that $P_i \in U_k$, using the appropriate Birkhoff interpolation coefficients $\lambda_{i,S}$.

Each user in S can locally map its own $(t_{(k-1)}, n)$ share $x_i$ into $(t,t)$ share of x, and $$\varpi_i = (\lambda_{i,S})(x_i), \text{ i.e. } x = \sum_{i \in S} \varpi_i.$$

Since $X_i = g^{x_i}$ and $\lambda_{i,S}$ are public values, all users can compute $W_i = g^{\varpi_i} = X_i^{\lambda_{i,S}}$ At step 502, each user $P_i$ select random values $k_i, \gamma_i$ to compute $[C_i, D_i] = \text{Com}(g^{\gamma_i})$ and broadcast $C_i$; wherein $$k = \sum_{i \in S} k_i \cdot \gamma = \sum_{i \in S} \gamma_i$$

$$k\gamma = \sum_{ij \in S} k_i \gamma_j \pmod{q} \text{ and}$$

$$kx = \sum_{ij \in S} k_i \varpi_j \pmod{q}$$

At step 503, every pairs of users $P_i, P_j$ runs two multiplicative-to-additive (MtA) share conversion sub-protocol. In particular, every pairs of users $P_i, P_j$ runs MtA with shares $k_i, \gamma_j$ respectively.

Assuming $\alpha_{ij}$,[resp.$\beta_{ij}$] be the shares received by user $P_i$[resp.$P_j$] at the end of the MtA protocol $k_i \gamma_i = \alpha_{ij} + \beta_{ij}$. Then the user $P_i$ set $\delta_i$, wherein:

$$\delta_i = k_i \gamma_i + \sum_{j \neq 1} a_{ij} + \sum_{j \neq 1} \beta_{ij}.$$

Note that $\delta_i$ are the (t,t) additive sharing of $$k\gamma = \sum_{i,j \in s} \delta_i, P_i, P_j$$

Run MtA with shares $k_i, \overline{\omega}_j$ respectively. Assuming $\mu_{ij}$, [resp.$v_{ij}$] be the shares received by user $P_i$[resp. $P_j$] at the end of the MtA protocol. i.e., $k_i \overline{\omega}_i = \mu_{ij} + v_{ij}$ Then the user $P_i$ set $\sigma_i$ and wherein:

$$\sigma_i = k_i \varpi_i + \sum_{j \neq i} \mu_{ij} + \sum_{j \neq i} v_{ij}$$

Note that $\sigma$ are the (t,t) additive sharing of $$kx = \sum_{i,j \in s} \sigma_i.$$

At step 504, every pairs of users $P_i$ broadcasts $\delta_i$ and the user reconstruct $$\delta = \sum_{i \in s} b_i = k\gamma.$$

Also, the user calculates $\delta^{-1} \pmod{q}$.

At step 505, Each user $P_i$ broadcasts $D_i$. Assuming $\Gamma_i = g^{\gamma_i}$ be the values decommitted by $P_i$ who proves in ZK that he knows using Schnorr's protocol. Then, the user compute $$R = \left[\prod_{i \in s} \Gamma_i\right]^{\delta^{-1}} == g\left(\sum_{i \in s} \gamma_i\right) k^{-1} \gamma^{-1} = g^{\gamma k^{-1} \gamma^{-1}}$$

and $r = H'(R)$

At step 506, every pair of users $P_i$ compute $s_i = mk_i + r\sigma_i$.

Note that:

$$\sum_{i \in S} s_i = m \sum_{i \in S} k_i + r \sum_{i \in S} \sigma_i = mk + rkx = k(m + xr) = s$$

At step 507, each user $P_i$ select random values $l_i$, $\rho_i$ and compute $V_i = R^{s_i} g^{l_i}, \Delta_i = g^{\rho_i}$, and $[\hat{C}_i, \hat{D}_i] = \text{Com}(V_i, \Delta_i)$ and each user broadcasts $\hat{C}_i$. Assuming $$l = \sum_i l_i \text{ and } \varrho = \sum_i \varrho_i$$

At step 508, each user $P_i$ broadcasts $\hat{D}_i$, and proves in ZK that he knows $s_i, l_i, \rho_i$ such that $V_i = R^{s_i} g^{l_i}$ and $\Delta_i^{\rho_i}$. If a ZK proof fails, then the user aborts the protocol. Assuming.

$$V = g^{-m} y^{-r} \sum_i V_i = g^l \text{ and } \Delta = \prod_{i \in S} \Delta_i$$

At step 509, each user $P_i$ computes $U_i = V^{\rho_i}$ and $T_i = \Delta^{\rho_i}$. And commits $[\tilde{C}_i, \tilde{D}_i] = \text{Com}(U_i, T_i)$ and broadcast $\tilde{C}_i$.

At step 510, each user $P_i$ broadcast $D_i$ to decommit to $U_i, T_i$. The user aborts the protocol if:

$$\prod_{i \in S} [T_i] \neq \prod_{i \in S} U_i$$

At step 511, each user $P_i$ broadcast $s_i$. The user computes $$s = \sum_{i \in S} s_i$$

If (r,s) is a valid signature, the user accepts and ends the protocol. Alternatively, the use may abort the protocol.

In accordance with one or more embodiments of the present disclosure, the signature protocol runs on an input m (this hash of message M being signed) and an output of the hierarchical threshold key generation protocol 400. In particular, the signature protocol is a conjunctive hierarchical threshold signature protocol. Moreover, the public key (secret key) is shared using a verifiable hierarchical threshold secret sharing protocol (VHTSS) described in protocol 400.

Birkhoff Interpolation Coefficient

Let us assume
- $X = \{x_1, \ldots, x_k\}$ ... given set of points in the set of real number (R), where $x_1 < x_2 < \ldots < x_k$.
- $E = (e_{ij})_{1 \leq i \leq k, 0 \leq j \leq l}$ is a matrix with binary entries, such that: $I(E) = \{(i,j): e_{ij} = 1\}$ and $N = |I(E)|$
- $C = \{c_{ij}: (i,j) \in I(E)\}$ is a set of N real values.
- $C' = \{c'_i: 1, \ldots, N\}$ be another vector that is obtained by lexicographically ordering of entries of C.

Then the Birkhoff interpolation problem that corresponds to the triplet <X,E,C> is the problem of finding a polynomial $$P(X) \in R_{N-1}[x]$$

satisfying the N equalities $$P^{(j)}(x_i) = c_{ij}, (i,j) \in I(E).$$

Let $\varphi = \{g_0, g_1, \ldots, g_{N-1}\} = \{1, x^1, x^2, \ldots, x^{N-1}\}$ be a system of linearly independent, N−1 times continuously differentiable real-valued functions.

By using the elements $E, X, \varphi$ we are able to solve the Birkhoff interpolation problem as $$P(x) = \sum_{i=0}^{N-1} c'_{i+1} \left( \sum_{j=0}^{N-1} (-1)^{i+j} \frac{|A_i(E, X, \phi_i)|}{|A(E, X, \phi)|} g_j(x) \right)$$

where $A(E,X,\varphi) = (a_{ij})_{N \times N}$
$a_{ij} = g_{j-1}^{\alpha_i(2)}(x_{\alpha_i(1)})$
$i = 1, \ldots, N$
$j = 1, \ldots, N$ $A_i(E,X,\varphi_i)$ can be computed from $A(E,X,\varphi_i)$ by removing (i+1)th row and (j+1)th row and $A(E,X,\varphi_j)$ can be compute by replacing (j+1)th column of A $(E,X,\varphi)$ with C'. |·| is the determinant operation.

The Birkhoff interpolation coefficient $\lambda_i$ for j=0 can be defined as $$\lambda_i = c'_{i+1}(-1)^i \frac{|A_i(E, X, \phi_0)|}{|A(E, X, \phi)|}$$

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

Although some features and examples herein have been described in language specific to structural features or methodological steps, it is to be understood that the subject matter herein is not necessarily limited to the specific features or steps described. Any process descriptions, elements or blocks in the flow diagrams described herein or depicted in the attached figures should be understood as potentially representing modules, segments, or portions of code that include one or more executable instructions for implementing specific logical functions or elements in the process. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components is not limited to embodiments including exactly that number of those components, unless expressly specified. However, such a claim does describe both embodiments that include exactly the specified number of those components and embodiments that include at least the specified number of those components.

What is claimed is:

1. A method for creating a hierarchical threshold digital asset wallet using a hierarchical distributed key generator (DKG) and a signature protocol, the method comprising:
   generating a public key by a user on a user device (102) and a digital asset wallet service platform (101) using a hierarchical threshold key generation protocol (400);
   securing and controlling a portion of shares by the user and the digital asset wallet service platform (101) in one or more of m disjoint subsets for generating of a signature of a signed digital asset transaction;
   sending a transaction signing request by the user through a wallet service API (201) to the digital asset wallet service platform (101) for transferring digital assets outside the hierarchical threshold digital asset wallet;
   validating the transaction signing request by determining whether the transaction signing request adheres to a predefined access policy;
   facilitating the user device (102) and the digital asset wallet service platform (101) on a successful validation to jointly run a hierarchical threshold signature protocol (500);
   creating a signature of a signed transaction using the hierarchical threshold signature protocol (500); and
   uploading the signed transaction to a corresponding digital asset blockchain network and monitoring execution of the signed transaction;
   wherein the method allows a plurality of users to jointly generate the public key using the hierarchical threshold key generation protocol (400) comprising steps of:
   broadcasting the public key ($E_i$) for a homomorphic encryption by the user ($P_i$) and wherein $P_i = P_i \in U$);
   constructing two random polynomial values (f_i and f_i') and broadcasting (C_ij);
   computing the shares ($sh_{i-j}$ and $sh'_{i-j}$) corresponding to each user ($P_i \in U$) and sending the shares ($sh_{i-j}$ and $sh'_{i-j}$) through a secure channel;
   checking the shares ($sh_{i-j}$ and $sh'_{i-j}$) for consistency by verifying for i=1, . . . , n (i≠j);
   computing ($x_i$) by each user ($P_i \in U$) by adding a received private share and $x_i = \Sigma_j sh_{j \to i}$;
   broadcasting a broadcast value ($A_{il}$) by each user ($P_i \in U$) for added private shares;
   checking the broadcast value ($A_{il}$) by each user ($P_i \in U$) to verify ($G_{shi \to j}$) value;
   associating a RSA modulus ($N_i = p_i q_i$) with the public key ($E_i$); and
   setting the public key to $y = \Pi_i y_i$ by each user ($P_i \in U$);
   wherein each user ($P_i \in U$) proves in a Zero-knowledge that user knows $x_i$ using a Schonorr's protocol and $p_i q_i$ using a proof of knowledge of integer factorization.

2. The method as claimed in claim 1, wherein the hierarchical threshold key generation protocol (400) is configured to provide a signing power to a n multiple shares.

3. The method as claimed in claim 2, wherein a set of the n multiple shares is partitioned into m disjoint subsets of shares (U1, U2, . . . , Um).

4. The method as claimed in claim 1, wherein users in a same subset have equal authority level.

5. The method as claimed in claim 1, wherein an authorized subset is defined by an increasing sequence of threshold parameters $t_0 < t_1 < \ldots < t_m$.

6. A method for creating a hierarchical threshold digital asset wallet using a hierarchical distributed key generator (DKG) and a signature protocol, the method comprising:
   generating a public key by a user on a user device (102) and a digital asset wallet service platform (101) using a hierarchical threshold key generation protocol (400);
   securing and controlling a portion of shares by the user and the digital asset wallet service platform (101) in one or more of m disjoint subsets for generating of a signature of a signed digital asset transaction;
   sending a transaction signing request by the user through a wallet service API (201) to the digital asset wallet service platform (101) for transferring digital assets outside the hierarchical threshold digital asset wallet;
   validating the transaction signing request by determining whether the transaction signing request adheres to a predefined access policy;
   facilitating the user device (102) and the digital asset wallet service platform (101) on a successful validation to jointly run a hierarchical threshold signature protocol (500);
   creating a signature of a signed transaction using the hierarchical threshold signature protocol (500); and
   uploading the signed transaction to a corresponding digital asset blockchain network and monitoring execution of the signed transaction, wherein the method further allows plurality of users to create a joint threshold digital signature using the signature protocol, wherein the method comprising:
   selecting a set of users ($S \subseteq [1 \ldots n]$) by user ($P_i \in U$) to participate in the signature protocol;
   computing [$C_i, D_i$] by selecting random values ($k_i, \gamma_i$) by each user ($P_i \in U$), and [$C_i, D_i$]=Com($g^{\gamma_i}$);
   broadcasting $C_i$;
   running two multiplicative-to-additive (MtA) share conversion sub-protocol by a pair of user ($P_i, P_j$);
   broadcasting $\delta_i$ by every pair of the user ($P_i \in U$) and broadcasting $\delta$;
   broadcasting $D_i$ by each user ($P_i \in U$);
   computing $s_i = mk_i + r\sigma_i$ by each user ($P_i \in U$);
   selecting random values $l_i, \rho_i$ by each user ($P_i \in U$) and compute [$\hat{C}_i, \hat{D}_i$];
   broadcasts $\hat{C}_i$ and $\hat{D}_i$ by each user ($P_i \in U$);
   computing $U_i = V^{\rho_i}$ and $T_i = \Delta^{\rho_i}$ by each user ($P_i \in U$) and commits [$\check{C}_i, \check{D}_i$]=Com($U_i, T_i$) and broadcast $\check{C}_i$;
   broadcasting $\check{D}_i$ by each user ($P_i \in U$) to decommit to and broadcasting $s_i$ and computing s by each user ($P_i \in U$);
   wherein when (r,s) is a valid signature then the user ($P_i \in U$) accepts and ends the signature protocol.

7. The method as claimed in claim 6, wherein the signature protocol runs on an input m and an output of the hierarchical threshold key generation protocol (400).

8. The method as claimed in claim 7, wherein the signature protocol is a conjunctive hierarchical threshold signature protocol (500).

9. The method as claimed in claim 1, wherein the public key is shared using a verifiable hierarchical threshold secret sharing protocol (VHTSS).

* * * * *